(12) United States Patent
Williams et al.

(10) Patent No.: US 10,286,271 B2
(45) Date of Patent: May 14, 2019

(54) LACROSSE HEAD

(71) Applicant: Cascade Maverik Lacrosse, LLC, Exeter, NH (US)

(72) Inventors: David Williams, Fulton, NY (US); Nicholas Colville, Syracuse, NY (US); Michael Chmelik, Manilus, NY (US); David Winthrop Fream, Newfield, NH (US)

(73) Assignee: Cascade Maverik Lacrosse, LLC, Exeter, NH (US)

(*) Notice: Subject to any disclaimer, the term of this patent is extended or adjusted under 35 U.S.C. 154(b) by 0 days.

(21) Appl. No.: 15/583,814

(22) Filed: May 1, 2017

(65) Prior Publication Data

US 2018/0311549 A1     Nov. 1, 2018

(51) Int. Cl.
    *A63B 59/20* (2015.01)
    *A63B 60/50* (2015.01)
    *A63B 71/00* (2006.01)
    *B29C 45/16* (2006.01)
    *A63B 102/14* (2015.01)

(52) U.S. Cl.
    CPC .............. *A63B 59/20* (2015.10); *A63B 60/50* (2015.10); *A63B 71/0045* (2013.01); *A63B 2102/14* (2015.10); *B29C 45/1676* (2013.01)

(58) Field of Classification Search
    CPC ...... A63B 59/20; A63B 2102/14; A63B 60/50
    See application file for complete search history.

(56) References Cited

U.S. PATENT DOCUMENTS

| | | | | |
|---|---|---|---|---|
| 4,657,260 A * | 4/1987 | Brine, Jr. | ............... | A63B 59/20 473/513 |
| 5,494,297 A * | 2/1996 | MacNeil | ................ | A63B 59/20 473/513 |
| 5,568,925 A * | 10/1996 | Morrow | ................ | A63B 59/20 473/513 |
| 6,561,932 B2 | 5/2003 | Morrow et al. | | |
| 6,902,501 B2 | 6/2005 | Morrow et al. | | |
| 6,926,627 B1 * | 8/2005 | LeMire | ................ | A63B 60/42 33/533 |
| D736,871 S | 8/2015 | Janisse et al. | | |
| 2006/0194655 A1 * | 8/2006 | Tucker, Sr. | ............ | A63B 59/20 473/513 |
| 2009/0247331 A1 * | 10/2009 | Schmidt | ................ | A63B 59/20 473/513 |
| 2012/0071280 A1 * | 3/2012 | Copeland | ............... | A63B 59/20 473/513 |
| 2014/0103566 A1 * | 4/2014 | Janisse | ................. | B29C 70/688 264/161 |
| 2015/0119173 A1 * | 4/2015 | Yachimowicz | ........ | A63B 59/02 473/513 |
| 2016/0206939 A1 * | 7/2016 | Huffa | .................... | B29C 70/688 |
| 2017/0340934 A1 * | 11/2017 | Kohler | .................... | A63B 59/20 |
| 2018/0001167 A1 * | 1/2018 | Miceli | .................... | A63B 59/20 |

* cited by examiner

*Primary Examiner* — Alvin A Hunter
*Assistant Examiner* — Amir A Klayman
(74) *Attorney, Agent, or Firm* — Wolf, Greenfield & Sacks, P.C.

(57) ABSTRACT

Lacrosse head sidewalls are arranged to apply additional tension to a pocket in an upper section of the head. A sidewall bottom rail includes an outward shift of an inwardly-facing surface and/or a downwardly-facing surface such that one or both of these features is spaced further from a longitudinal centerline plane of the head as compared to a head with no such outward shift.

15 Claims, 10 Drawing Sheets

LACROSSE HEAD

FIELD

Aspects of the disclosure relate generally to lacrosse heads and more specifically to lacrosse head sidewalls arranged to permit the application of increased tension on a pocket.

DISCUSSION OF RELATED ART

Lacrosse head sidewalls typically include a top rail and a bottom rail. In many lacrosse heads, one or more struts connect the top rail to the bottom rail to provide rigidity to the head. The bottom rails include stringing holes through which strings associated with the pocket are laced. In some lacrosse heads that include mesh pockets, sidewall strings are strung through the holes in the bottom rail and passed through openings in the mesh to attach the mesh to the head. In some lacrosse heads that include strung pockets, strings of the pockets are directly tied to the lacrosse head.

SUMMARY

According to one embodiment, a lacrosse head includes a scoop end, a ball stop end, an imaginary longitudinal centerline plane extending from the ball stop end to the scoop end, and first and second opposed sidewalls. The first and second sidewalls extend from a lower head section to an upper head section, wherein the first sidewall includes a first bottom rail having a first bottom, downwardly-facing surface that includes an inside edge and an outside edge. The first bottom rail has a first outermost outwardly-facing surface at lengthwise positions of the first bottom rail. The second sidewall includes a second bottom rail having a second bottom, downwardly-facing surface that includes an inside edge and an outside edge. The second bottom rail has a second outermost outwardly-facing surface at lengthwise positions of the first bottom rail. In the lower head portion, the outside edge of the first bottom, downwardly-facing surface is positioned inwardly from the first outermost outwardly-facing surface by a first distance. In the lower head portion, the outside edge of the second bottom, downwardly-facing surface is positioned inwardly from the second outermost outwardly-facing surface by a second distance. In the upper head section, the outside edge of the first bottom, downwardly-facing surface is positioned inwardly from the first outermost outwardly-facing surface by a third distance that is less than the first distance. In the upper head section, the outside edge of the second bottom, downwardly-facing surface is positioned inwardly from the second outermost outwardly-facing surface by a fourth distance that is less than the second distance. On the first bottom rail at a first shift location where the first outside edge starts to shift outwardly to be closer to the first outermost outwardly-facing surface, the inside edge of the first downwardly-facing surface moves outwardly away from the longitudinal centerline plane. On the second bottom rail at a second shift location where the second outside edge starts to shift outwardly to be closer to the second outermost outwardly-facing surface, the inside edge of the second downwardly-facing surface moves outwardly away from the longitudinal centerline plane.

According to another embodiment, a lacrosse head includes a scoop end with a scoop, a ball stop end with a ball stop, an imaginary longitudinal centerline plane extending from the ball stop end to the scoop end, and first and second opposed sidewalls. The first and second sidewalls extend from a lower head section to an upper head section. The first sidewall includes a first bottom rail having a first bottom, downwardly-facing surface that includes an inside edge and an outside edge. The first bottom rail has a first outermost outwardly-facing surface at lengthwise positions of the first bottom rail. The second sidewall includes a second bottom rail having a second bottom, downwardly-facing surface that includes an inside edge and an outside edge. The second bottom rail has a second outermost outwardly-facing surface at lengthwise positions of the first bottom rail. In the lower head portion, the inside edge of the first bottom, downwardly-facing surface is positioned inwardly from the first outermost outwardly-facing surface by a first distance. In the lower head portion, the inside edge of the second bottom, downwardly-facing surface is positioned inwardly from the second outermost outwardly-facing surface by a second distance. In the upper head section, first starting at a location at least halfway from the ball stop to the scoop, the inside edge of the first bottom, downwardly-facing surface is positioned inwardly from the first outermost outwardly-facing surface by a third distance that is less than the first distance. In the upper head section, first starting at a location at least halfway from the ball stop to the scoop, the inside edge of the second bottom, downwardly-facing surface is positioned inwardly from the second outermost outwardly-facing surface by a fourth distance that is less than the second distance.

According to a further embodiment, a lacrosse head includes a scoop end, a ball stop end, and first and second opposed sidewalls. The first and second sidewalls extend from a lower head section to an upper head section, the lower head section extends from the ball stop end to a first location five inches from the ball stop end, the upper head section extends from the first location to the scoop end, the first sidewall includes a first bottom rail, and the second sidewall includes a second bottom rail. The first bottom rail having a first innermost inwardly-facing surface at lengthwise positions of the first bottom rail. The second bottom rail having a second innermost inwardly-facing surface at lengthwise positions of the of the second bottom rail. The first bottom rail has pocket attachment locations in the lower head section. The second bottom rail has pocket attachment locations in the lower head section. The first bottom rail has pocket attachment locations in the upper head section. The second bottom rail has pocket attachment locations in the upper head section. In the lower head section, the pocket attachment locations of the first bottom rail are positioned outwardly from the innermost inwardly-facing surface of the first bottom rail by a first average distance of greater than or equal to zero. In the lower head section, the pocket attachment locations of the second bottom rail are positioned outwardly from the innermost inwardly-facing surface of the first bottom rail by a second average distance of greater than or equal to zero. In the upper head section, the pocket attachment locations of the first bottom rail are positioned outwardly from the third innermost inwardly-facing surface by a third average distance that is greater than the first average distance. In the upper head section, the pocket attachment locations of the second bottom rail are positioned outwardly from the second innermost inwardly-facing surface by a fourth average distance that is greater than the second distance.

According to another embodiment, a lacrosse head includes a scoop end, a ball stop end, and first and second opposed sidewalls, wherein the first and second sidewalls extend from a lower head section to an upper head section, the first sidewall includes a first bottom rail, and the second sidewall includes a second bottom rail. The first bottom rail has a first innermost inwardly-facing surface at lengthwise positions of the first bottom rail, and the second bottom rail has a second innermost inwardly-facing surface at lengthwise positions of the of the second bottom rail. The first and second bottom rails each have pocket attachment locations in the lower head section and pocket attachment locations in the upper head section. In the lower head section, a majority of the pocket attachment locations are positioned no more than 0.03 inches outwardly from the innermost inwardly-facing surface of the respective bottom rails. In the upper head section, at least one of the pocket attachment locations of the first bottom rail and at least one of the pocket attachment locations of the second bottom rail is positioned at least 0.10 inches outwardly from the innermost inwardly-facing surface of their respective bottom rails.

According to yet another embodiment, a lacrosse head includes a scoop end, a ball stop end, and first and second opposed sidewalls, wherein the first sidewall includes a first bottom rail and a first top rail, and the second sidewall includes a second bottom rail and a second top rail. The first top rail has a first innermost inwardly-facing surface at lengthwise positions of the first top rail, and the second top rail has a second innermost inwardly-facing surface at lengthwise positions of the second top rail. The first and second bottom rails each have pocket attachment locations in the lower head section and pocket attachment locations in the upper head section. In the lower head section, a majority of the pocket attachment locations of the first bottom rail are positioned no more than 0.05 inches outwardly from the innermost inwardly-facing surface of the first bottom rail. In the lower head section, a majority of the pocket attachment locations of the second bottom rail are positioned no more than 0.05 inches outwardly from the innermost inwardly-facing surface of the second bottom rail. In the upper head section, a majority of the pocket attachment locations of the first bottom rail are positioned at least 0.125 inches outwardly from the innermost inwardly-facing surface of the first top rail. In the upper head section, a majority of the pocket attachment locations of the second bottom rail are positioned at least 0.125 inches outwardly from the innermost inwardly-facing surface of the second top rail.

According to a further embodiment, a lacrosse head includes a scoop end, a ball stop end, and first and second opposed sidewalls, wherein the first and second sidewalls extend from a lower head section to an upper head section, the first sidewall includes a first bottom rail, and the second sidewall includes a second bottom rail. The first bottom rail has a first innermost inwardly-facing surface at lengthwise positions of the first bottom rail. The second bottom rail having a second innermost inwardly-facing surface at lengthwise positions of the of the second bottom rail. The first bottom rail has a first plurality of stringing holes in the lower head section, with the first plurality of stringing holes positioned on a first inwardly-facing stringing hole surface. The second bottom rail has a second plurality of stringing holes in the lower head section, with the second plurality of stringing holes positioned on a second inwardly-facing stringing hole surface. The first bottom rail has a third plurality of stringing holes in the upper head section, with the third plurality of stringing holes positioned on a third inwardly-facing stringing hole surface. The second bottom rail has a fourth plurality of stringing holes in the upper head section, with the fourth plurality of stringing holes positioned on a fourth inwardly-facing stringing hole surface. In the lower head section, the first inwardly-facing stringing hole surface is positioned outwardly from the innermost inwardly-facing surface by a first distance of greater than or equal to zero. In the lower head section, the second inwardly-facing stringing hole surface is positioned outwardly from the innermost inwardly-facing surface by a second distance of greater than or equal to zero. In the upper head section, the third inwardly-facing stringing hole surface is positioned outwardly from the third innermost inwardly-facing surface by a third distance that is greater than the first distance. In the upper head section, the fourth inwardly-facing stringing hole surface is positioned outwardly from the second innermost inwardly-facing surface by a fourth distance that is greater than the second distance.

According to yet another embodiment, a lacrosse head includes a scoop end, a ball stop end, and first and second opposed sidewalls, wherein the first and second sidewalls extend from a lower head section to an upper head section, the first sidewall includes a first bottom rail, and the second sidewall includes a second bottom rail. The first bottom rail has a first innermost inwardly-facing surface at lengthwise positions of the first bottom rail. The second bottom rail has a second innermost inwardly-facing surface at lengthwise positions of the of the second bottom rail. The first and second bottom rails each have a plurality of stringing holes in the lower head section and a plurality of stringing holes in the upper head section, each of the plurality of stringing holes of the first and second bottom rails having an inner opening with a rim on the inwardly-facing surface of the respective bottom rails. In the lower head section, the plurality of stringing hole inner opening rims of the first and second bottom rails each have an innermost perimeter portion positioned no more than 0.05 inches outwardly from the innermost inwardly-facing surface of the respective bottom rails. In the upper head section, at least one of the stringing hole inner opening rims of the first bottom rail and at least one of the stringing hole inner opening rims of the second bottom rail have a perimeter portion positioned at least 0.1 inches outwardly from the innermost inwardly-facing surface of their respective bottom rails.

According to another embodiment, a lacrosse head includes a scoop end, a ball stop end, and first and second opposed sidewalls, wherein the first sidewall includes a first bottom rail and a first top rail, and the second sidewall includes a second bottom rail and a second top rail. The first top rail has a first innermost inwardly-facing surface at lengthwise positions of the first top rail, and the second top rail having a second innermost inwardly-facing surface at lengthwise positions of the second top rail, wherein the first and second bottom rails each have a plurality of stringing holes in the lower head section and a plurality of stringing holes in the upper head section, each of the plurality of stringing holes of the first and second bottom rails having an inner opening with a rim on an inwardly-facing surface of the respective bottom rails. In the lower head section, the stringing hole inner opening rims of the first and second bottom rails each have an innermost perimeter portion positioned no more than 0.05 inches outwardly from the innermost inwardly-facing surface of their respective top rails. In the upper head section, the stringing hole inner opening rims of the first and second bottom rails each have a perimeter portion positioned at least 0.1 inches outwardly from the innermost inwardly-facing surface of their respective top rails.

According to a further embodiment, a lacrosse head includes a scoop end, a ball stop end, and first and second opposed sidewalls, wherein the first and second sidewalls extend from a lower head section to an upper head section, the first sidewall includes a first bottom rail, and the second sidewall includes a second bottom rail. The first bottom rail has a first outermost inwardly-facing surface at lengthwise positions of the first bottom rail, and a first outermost outwardly-facing surface at lengthwise positions of the first bottom rail. The second bottom rail has a second outermost inwardly-facing surface at lengthwise positions of the of the second bottom rail, and a second outermost outwardly-facing surface at lengthwise positions of the first bottom rail. In the lower head section, the first outermost inwardly-facing surface is positioned inwardly from the outermost outwardly-facing surface by a first distance. In the lower head section, the second outermost inwardly-facing surface is positioned inwardly from the outermost outwardly-facing surface by a second distance. In the upper head section, the first outermost inwardly-facing surface is positioned inwardly from the first outermost outwardly-facing surface by a third distance that is less than the first distance. In the upper head section, the second outermost inwardly-facing stringing hole surface is positioned inwardly from the second outermost outwardly-facing surface by a fourth distance that is less than the second distance.

According to another embodiment, a lacrosse head includes a scoop end having a scoop, a ball stop end having a ball stop, and an imaginary longitudinal centerline plane extending from the ball stop end to the scoop end, and first and second opposed sidewalls. The first and second sidewalls extend from a lower head section to an upper head section, wherein the first sidewall includes a first bottom rail having a first bottom, downwardly-facing surface that includes an inside edge and an outside edge, and the first bottom rail also includes a first outermost outwardly-facing surface. The second sidewall includes a second bottom rail having a second bottom, downwardly-facing surface that includes an inside edge and an outside edge, and the second bottom rail also includes a second outermost outwardly-facing surface. Starting at a first location at a distance of at least four inches from the ball stop, the outside edge of the first bottom, downwardly-facing surface moves outwardly toward the first outermost outwardly-facing surface by at least an eighth of an inch within a quarter inch of distance from the first location in a direction toward to the scoop end. Starting at the first location, the inside edge of the first bottom, downwardly-facing surface moves outwardly toward the first outermost outwardly-facing surface. Starting at a second location at a distance of at least four inches from the ball stop, the outside edge of the second bottom, downwardly-facing surface moves outwardly toward the second outermost outwardly-facing surface by at least an eighth of an inch of within a quarter inch distance from the second location in a direction toward to the scoop end. Starting at the second location, the inside edge of the second bottom, downwardly-facing surface moves outwardly toward the second outermost outwardly-facing surface.

According to a further embodiment, a lacrosse head includes a scoop end having a scoop, a ball stop end having a ball stop, an imaginary longitudinal centerline plane extending from the ball stop to the scoop end, and first and second opposed sidewalls, the first and second sidewalls extending from a lower head section to an upper head section. The first sidewall includes a first bottom rail having a first bottom, downwardly-facing surface that includes an inside edge and an outside edge. The first bottom rail also has a first outermost outwardly-facing surface. The second sidewall includes a second bottom rail having a second bottom, downwardly-facing surface that includes an inside edge and an outside edge. The second bottom rail also has a second outermost outwardly-facing surface. Starting at a first location at a distance of at least four inches from the ball stop, the inside edge of the first bottom, downwardly-facing surface moves outwardly toward the first outermost outwardly-facing surface by at least an eighth of an inch within a quarter of an inch of distance from the first location in a direction toward to the scoop end. Starting at a second location at a distance of at least four inches from the ball stop, the inside edge of the second bottom, downwardly-facing surface moves outwardly toward the second outermost outwardly-facing surface by at least an eighth of an inch within a quarter of an inch of distance from the second location in a direction toward to the scoop end.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
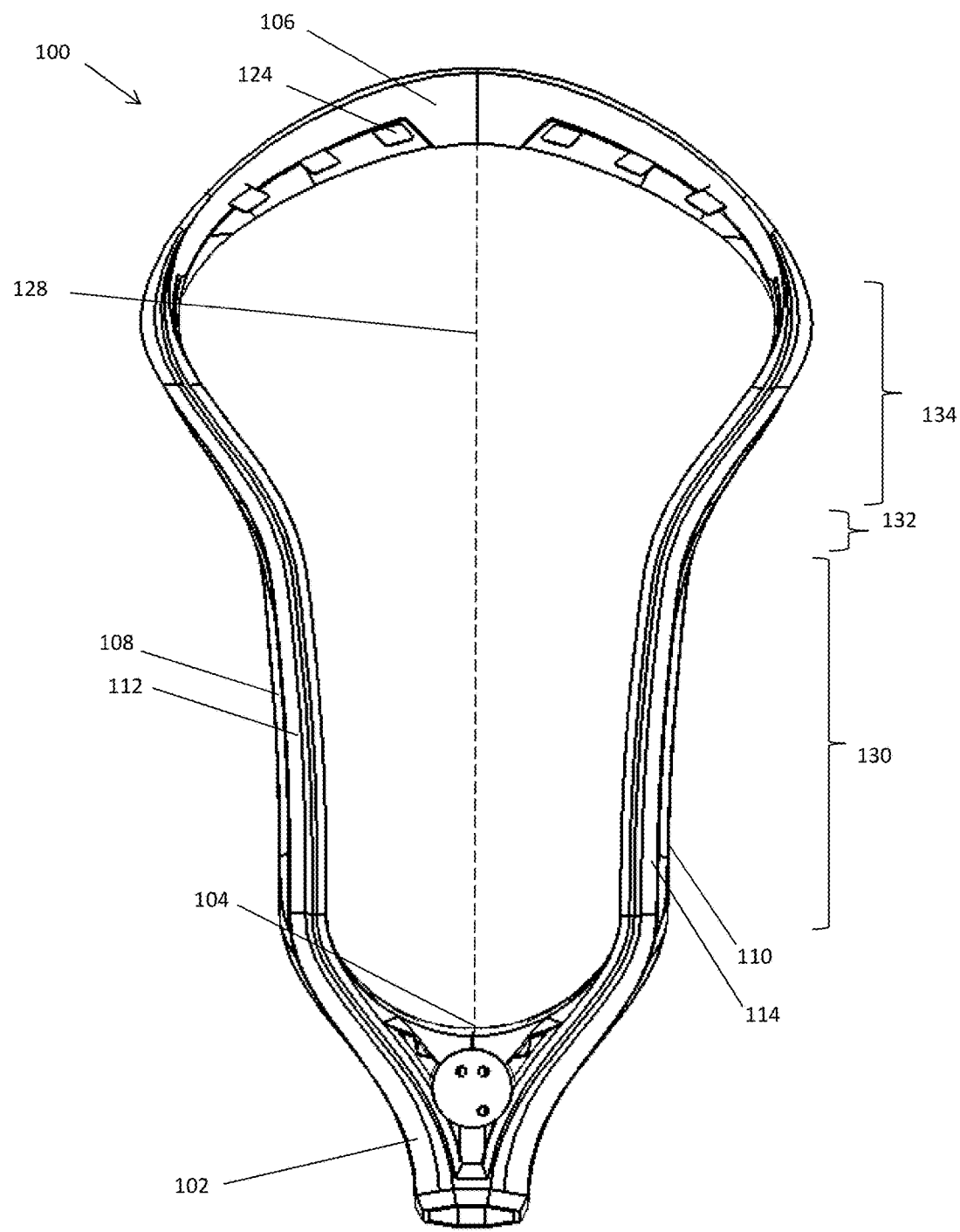
FIG. 1 is a front view of a lacrosse head according to one embodiment of the present disclosure.

Aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

A lacrosse head typically includes a throat for connection to a shaft, a ball stop region distal to the throat, and a scoop region at the far end of the head. Sidewalls connect the ball stop region to the scoop region and typically include a top rail and a bottom rail. A pocket may be formed by lacing various strands to the head using holes in scoop, the ball stop, and the bottom rails of the sidewalls. A catching and shooting zone is formed in the upper head region, and a holding region is created in the lower head region.

The pocket may be formed with a mesh of connected strands, such as nylon strands. When attaching a mesh pocket to a head, sidewall strings are passed through the holes of the sidewall bottom rail, and also passed through openings around the perimeter of the mesh. With the sidewall strings pulled tight, portions of the mesh are pulled against an inwardly-facing surface of the bottom rail and/or are pulled under the bottom rail such that they are held against a downwardly-facing surface of the bottom rail.

According to some embodiments of the present disclosure, a sidewall bottom rail has a downwardly-facing surface against which a mesh may be held. The downwardly-facing surface has an inside edge and an outside edge. In the upper head, the outside edge of the bottom rail downwardly-facing surface is positioned closer to (or at) an outermost surface of the bottom rail than it is in the lower head. That is, in the upper head, the downwardly-facing surface extends further away from a longitudinal centerline plane than it would if the downwardly-facing surface maintained the same positioning relative to the overall bottom rail as in the lower head.

In addition to, or instead of, the outside edge of the downwardly-facing surface being positioned outwardly toward the outermost surface of the bottom rail in the upper head, the inside edge of the downwardly-facing surface may be positioned outwardly toward the outermost surface of the bottom rail in the upper head. In the lower head, the inside edge of the downwardly-facing surface is not positioned as far outwardly toward the outermost bottom rail surface as in the upper head.

By shifting a portion or all of the downwardly-facing surface outwardly on the bottom rail in the upper head section, the mesh may be tensioned to a greater degree as compared to a head where the downwardly-facing surface is not shifted outwardly. This tensioning is achieved by lacing the strings or attaching the mesh such that the strings or mesh are held against the downwardly-facing surface of the bottom rail. The further outwardly the downwardly-facing surface extends, the further outwardly the pocket material can be pulled. By shifting the downwardly-facing surface relative to the bottom rail, the additional tensioning relative to a typical lacrosse head can be achieved without increasing the overall width of the lacrosse head in the tensioned regions in some embodiments.

According to some embodiments of the present disclosure, a sidewall bottom rail has an inwardly-facing surface with stringing holes, and the inwardly-facing surface with stringing holes is outwardly set back from an innermost inwardly-facing surface of a sidewall top rail and/or is set back from an innermost inwardly-facing surface of the bottom rail. That is, each of the inwardly-facing surfaces with stringing holes is spaced farther from a longitudinal centerline plane of the head than the top rail innermost inwardly-facing surface and/or the innermost surface of the bottom rail. By increasing the distance between the opposed inwardly-facing surfaces that have the stringing holes, the mesh can be tensioned to a greater degree as compared to opposed inwardly-facing surfaces that are more closely spaced.

The increase in distance between the inwardly-facing surfaces may be implemented in select areas of the lacrosse head to achieve specific pocket configurations. For example, in an upper section of the head, the inwardly-facing surfaces may be set back to increase tension in the pocket and create a desired channel shape in the pocket. In some embodiments, the channel may be generally in the shape of an inverted V. In the lower section of the head, the inwardly-facing surfaces of the bottom rail may not be set back relative to the top rail, thereby maintaining a tension and shape typically found in pockets that do not have inner surfaces which are set back. For example, in the lower head, a deep pocket may be formed with such an arrangement.

Instead of stringing holes, other attachment features may be used to secure the mesh or pocket strings to the head. These attachment features may be located on an inwardly-facing surface of the bottom rail, on a downwardly-facing surface of the bottom rail, or on an outwardly-facing surface of the bottom rail.

Embodiments disclosed herein may increase the versatility of certain pocket meshes. Many lacrosse heads have a 6.5 inch width across their widest points while others have a width of 6.0 inches. Even though some heads differ from one another in width at their widest points (e.g., 6.5 inches vs. 6.0 inches), other areas of 6.5 inch and 6.0 inch heads may have the same widths. When a mesh designed for a 6.5 inch head is attached to a typical 6.0 inch head, the mesh may not be sufficiently tensioned in the upper section of the head even though other areas are fitted well. By using lacrosse heads disclosed herein, a pocket mesh designed for a 6.5 inch head may be usable with a 6.0 inch head by applying desired tension in the upper section.

By not including a setback to the inwardly-facing surface and/or the downwardly-facing surface of the bottom rail in the lower section of the head, tension may be added to the pocket in the pocket upper section without substantially affecting the pocket tension in the lower section. For example, a mesh designed for a 6.5 inch head may be attached to a 6.0 inch head and maintain the same tension in the lower head due to the similar shapes and sizes of the two heads in the lower head sections, while the upper head has a set back surface to provide a similar tension in the 6.0 inch head as in the 6.5 inch head.

Some or all of the features achievable with embodiments disclosed herein may be accomplished without increasing the width of the lacrosse head in some cases. The stringing holes may be set back from the longitudinal centerline plane without projecting the outer, exterior surface of the bottom sidewall further outwardly than a traditional head.

FIG. 1 shows a lacrosse head 100 with a throat region 102, a ball stop end with a ball stop 104, and a scoop 106. First and second sidewalls 108, 110 extend from the ball stop 104 to the scoop 106, and each sidewall includes a top rail 112, 114. A mesh (not shown in FIG. 1) may be attached to the head to form a pocket.

The head has a lower head section 130, a transition section 132, and an upper head section 134. As described in greater detail below with references to FIGS. 3-5, according to some embodiments of the present disclosure, the upper head section has an outward setback of the bottom rail inwardly-facing stringing surfaces. This setback may be limited to the upper head section. That is, the lower head section may have a typical arrangement where the bottom rail inwardly-facing stringing surfaces are positioned the same distance from the longitudinal centerline plane as the innermost inwardly-facing surface of the top rail. In other embodiments, portions, but not all, of the lower head section may have the inwardly-facing stringing surface of the bottom rail set back from the longitudinal centerline plane more than the top rail inwardly-facing surface. In some cases, this setback in the lower head section is along less than half of the length along the sidewall within the lower section such that the majority of the inwardly-facing surface is not significantly set back from the top rail.

Figure 2:
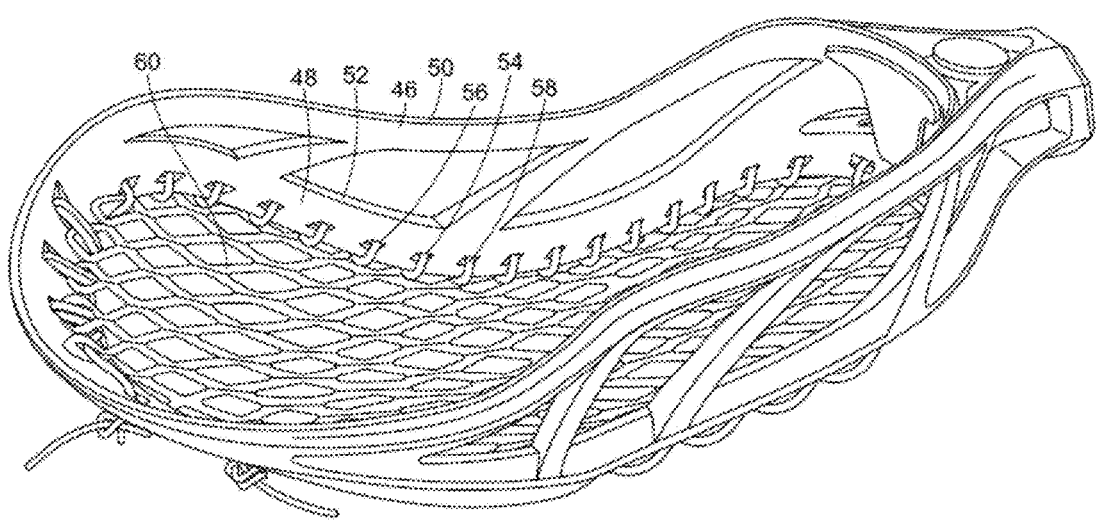
FIG. 2 shows a typical lacrosse head bottom rail with an attached mesh forming a pocket.

FIG. 2 shows a typical arrangement of a top rail 50 and a bottom rail 52 in that innermost inwardly-facing surfaces 46, 48 of the top rail 50 and bottom rail 52, respectively, are positioned at the same distance as each other from a longitudinal centerline plane of the head at any given longitudinal position along the length of the sidewalls.

The bottom rail has stringing holes 54 with inner rims 56 that are flush with the inwardly-facing surface. Sidewall strings 58 are looped through the stringing holes 54 and pull portions of a mesh 60 (e.g., portions of the perimeter) outwardly from the longitudinal centerline plane. In some areas, the mesh may be pulled against the rims of the stringing holes and the inwardly-facing surface of the bottom rail. In other areas, the mesh perimeter is held under the bottom rail by the sidewall strings.

In some typical arrangements, the bottom rail is positioned slightly outwardly from or slightly inwardly toward the longitudinal centerline plane as compared to the top rail due to a draft angle used during molding of the head. For purposes herein, a setback from the longitudinal centerline plane due solely to a draft angle of three degrees or less is not considered to be an arrangement where one inwardly-facing surface (e.g., a bottom rail) is set back from another inwardly-facing surface (e.g., a top rail).

Figure 3:
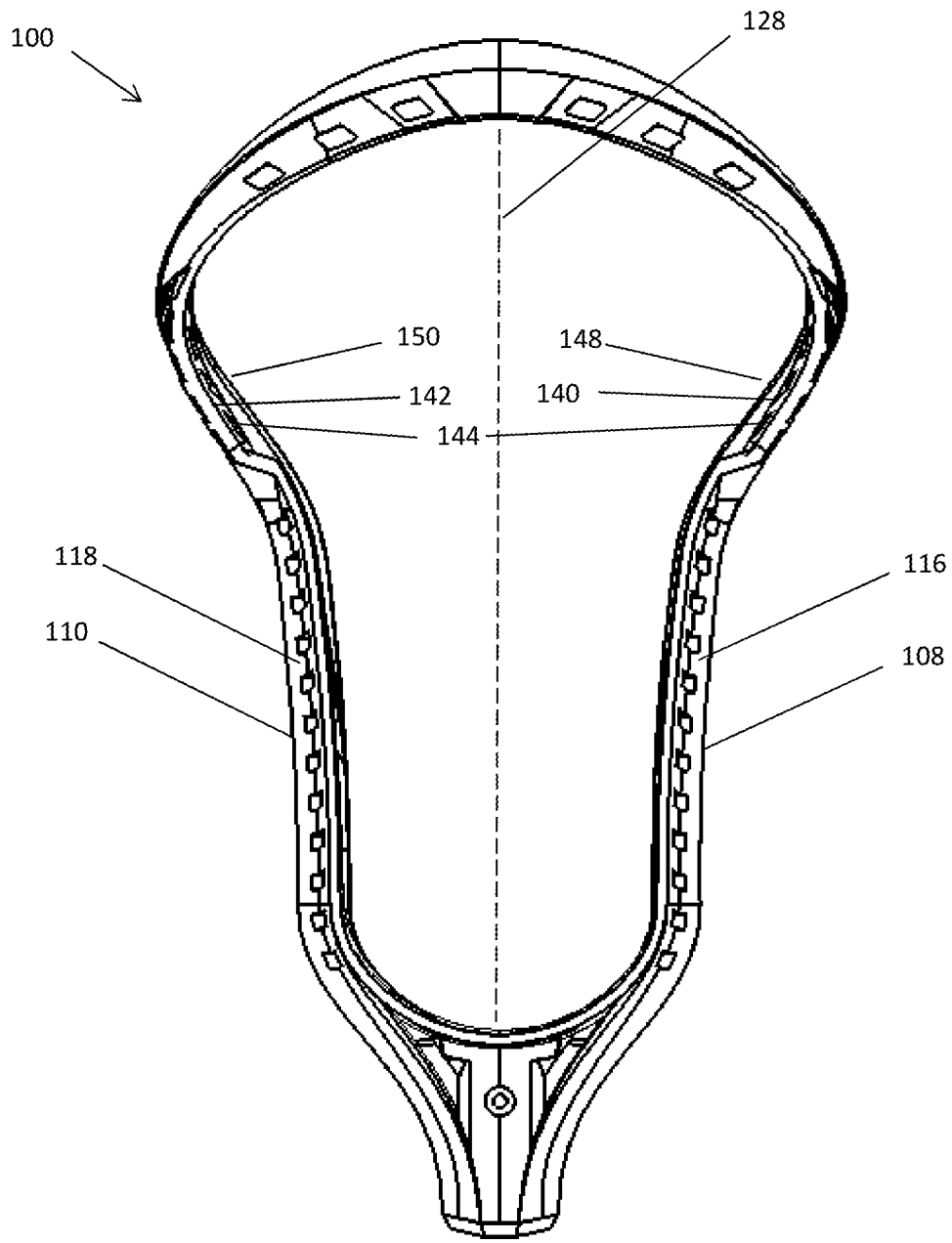
FIG. 3 is a rear view of the lacrosse head shown in FIG. 1.
Figure 4:
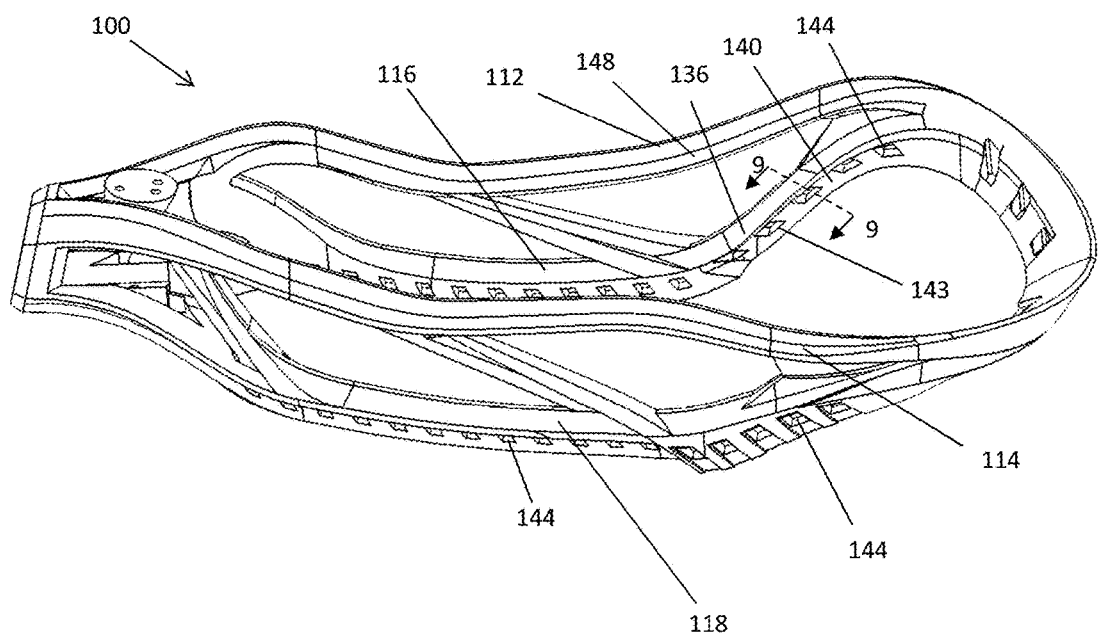
FIG. 4 is a perspective side view of the lacrosse head shown in FIGS. 1 and 3.
Figure 5:
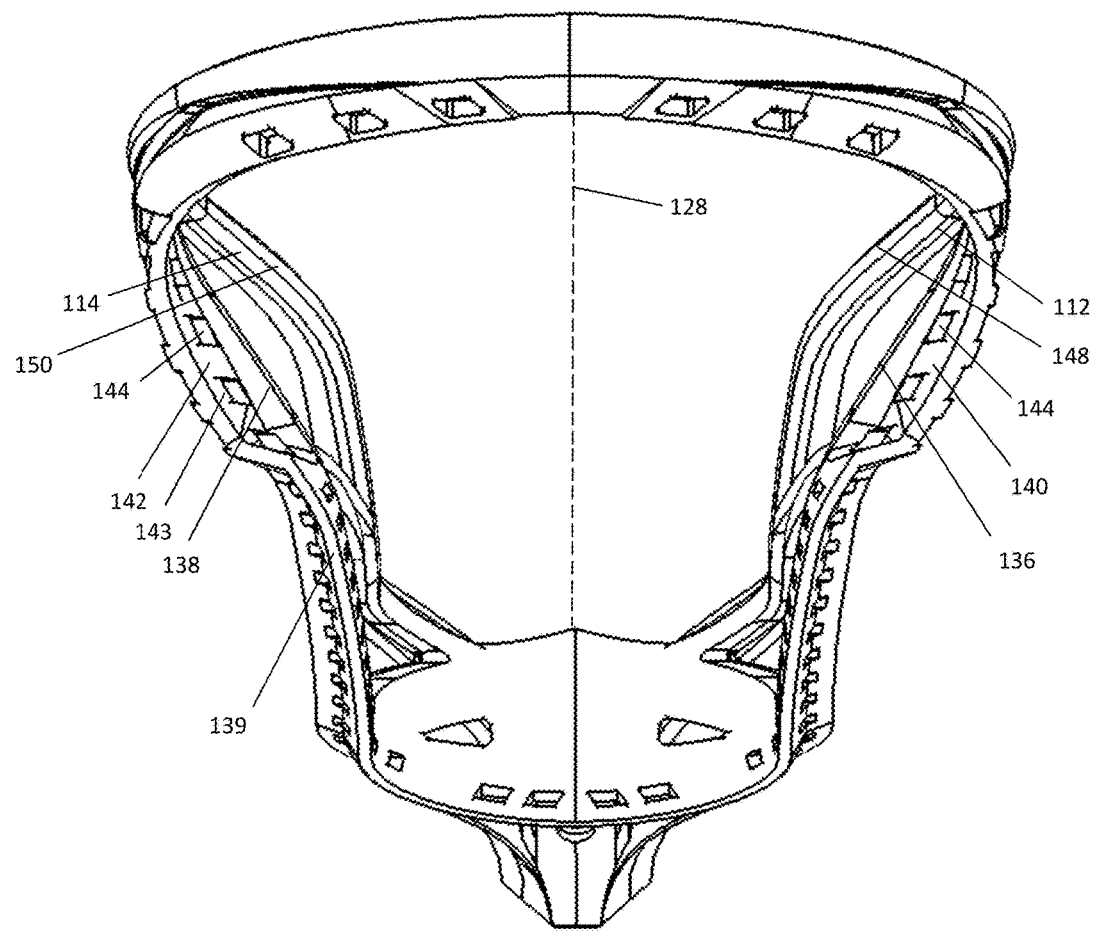
FIG. 5 is a perspective rear view of the lacrosse head shown in FIGS. 1, 3, and 4.

FIGS. 3-5 show an outwardly set back, inwardly-facing surface on a bottom rail according to one embodiment the present disclosure. FIG. 3 is a rear view of lacrosse head 100. The sidewalls 108, 110 of the lacrosse head 100 include bottom rails 116, 118. Inwardly-facing surfaces 140, 142 include stringing holes 144 for sidewall strings or pocket strings. In the upper section of the head, the inwardly-facing surfaces 140, 142 are positioned farther away from the longitudinal centerline plane 128 of the head as compared to innermost inwardly-facing surfaces 148, 150 of top rails 112, 114.

In the illustrated embodiment, the upper head section inwardly-facing surfaces 140, 142 that include the stringing holes 144 are also set back from the longitudinal centerline plane as compared to innermost surfaces 136, 138 of the bottom rails 116, 118 (See FIG. 4). Accordingly, in some embodiments, such as the embodiment of FIGS. 3-5, the inwardly-facing surfaces 140, 142 that include stringing holes are set back from both the innermost inwardly-facing surfaces 148, 150 of the top rail and the innermost inwardly-facing surfaces 136, 138 of the bottom rails 116, 118.

In other embodiments, the inwardly-facing surfaces 140, 142 with stringing holes may be the innermost surfaces of the bottom rail, and therefore be set back only from the innermost inwardly-facing surfaces of the top rail. In still other embodiments, the inwardly-facing surfaces 140, 142 may be set back from innermost inwardly-facing surfaces of the bottom rail, but not be set back from innermost surfaces of the top rails. In such an embodiment, the innermost surface of the bottom rail would be positioned inwardly toward the longitudinal centerline plane relative to the innermost surfaces of the top rails.

Figure 6:
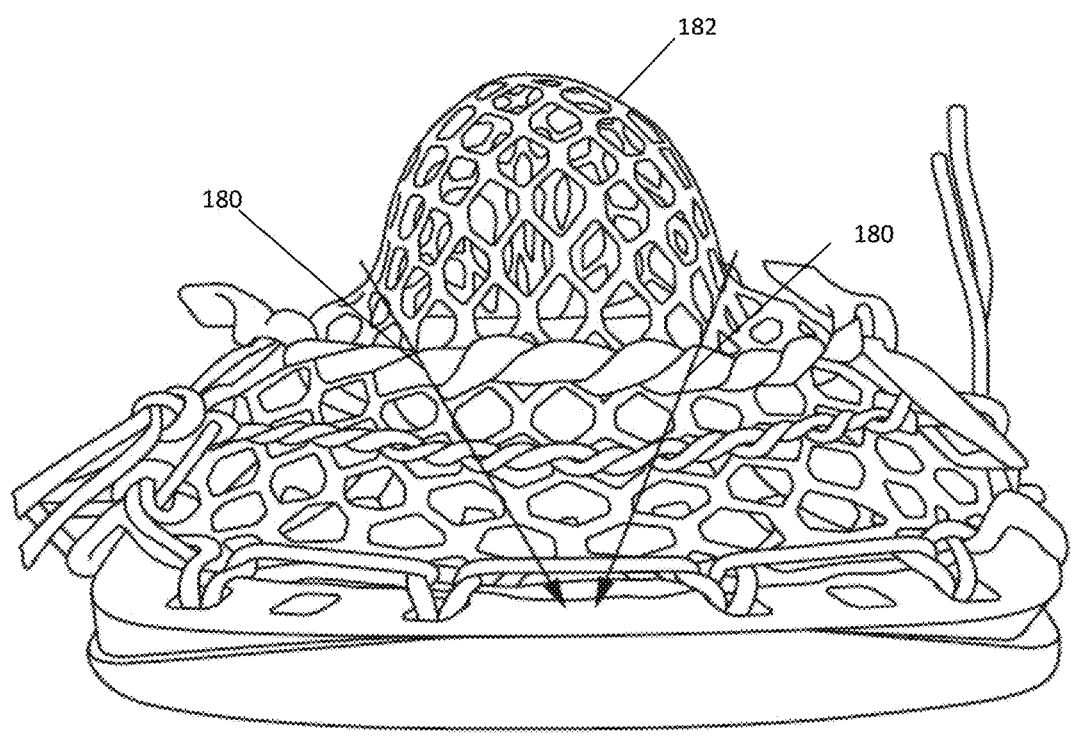
FIG. 6 shows a mesh attached to a lacrosse head and forming a ball channel in the pocket.

When sidewall strings are strung through the holes 144 and the mesh openings in the mesh pocket, portions of the perimeter of the pocket may be pulled toward and/or against inwardly-facing surfaces 140, 142, for example at rims 143 of the stringing holes 144. By spacing the inwardly-facing surface farther away from the center plane, a greater tension is applied to the mesh than with more closely spaced inwardly-facing surfaces. By applying extra tension to the mesh, a desired channel shape may be created in the pocket. For example, as shown in FIG. 6, an inverted V-shaped channel may be created. The V-shaped channel edges are indicated by arrows 180. Such a channel can help with shot and pass accuracy by urging the ball toward the longitudinal center axis of the head as the ball travels from a ball pocket 182 toward the scoop end allowing the narrowing channel.

Additionally, the extra tension on the pocket in the upper section of the head may help to locate the pocket's greatest depth higher in the head, which can facilitate quicker releases of the ball. Further, by implementing the set back bottom rail surface in the upper head section only, as may be done in some embodiments, the lower section of the head may maintain a deep pocket while these other features are realized.

For purposes herein, comparisons of the inward and outward positions of features relative to other features are made with reference to perpendicular distances between the features in certain situations. In a straightforward situation where first and second features are flat and parallel, the distance from the first feature to the second feature is a line that is perpendicular to both surfaces starting at the lengthwise position of the first feature. Additionally, for purposes herein, distances between features on sidewalls are determined based on a two-dimensional projection of the lacrosse head—the vertical distance between the features being irrelevant.

Figure 7:
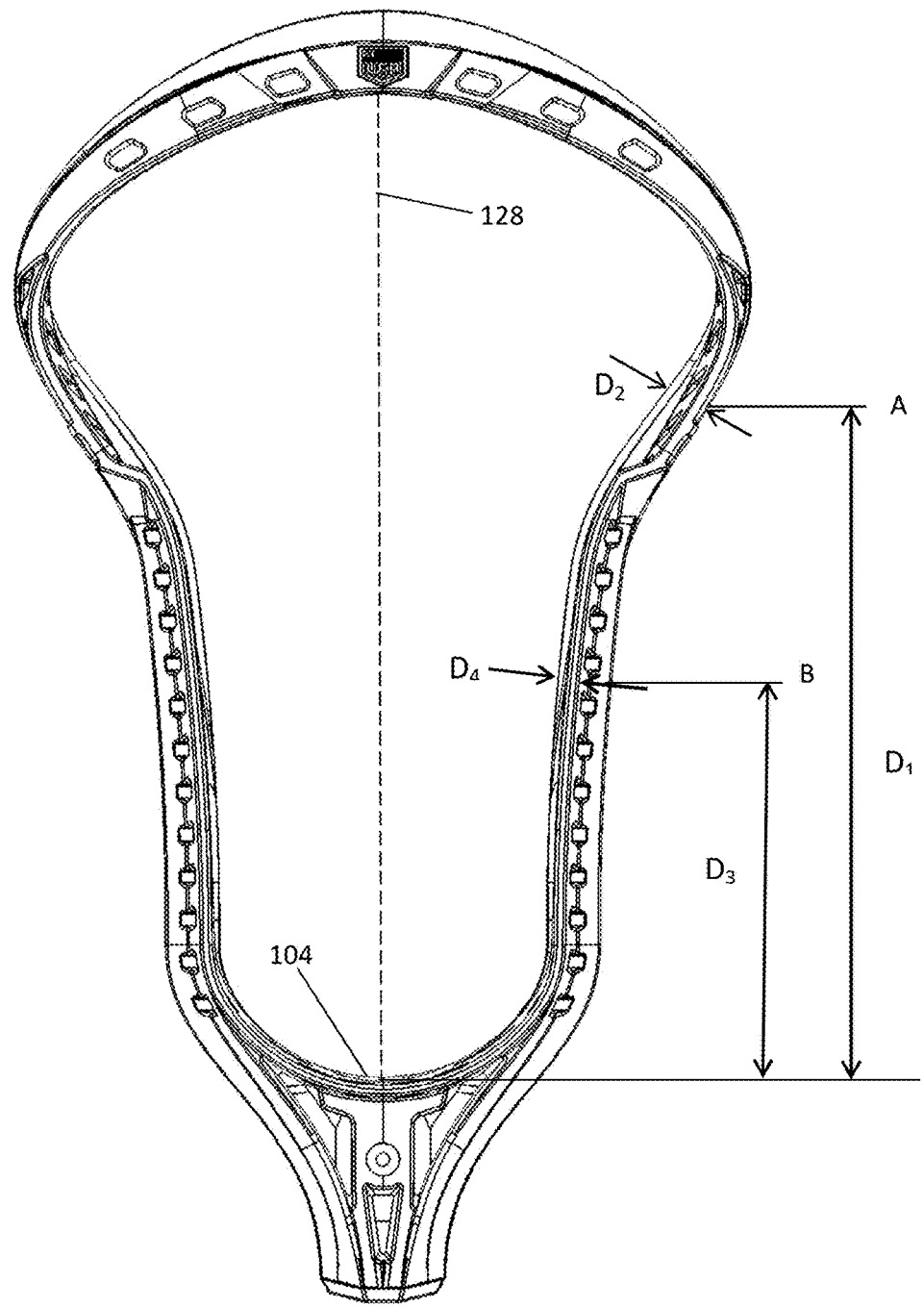
FIG. 7 is a rear view of the lacrosse head shown in FIGS. 1, 3, 4, and 5.

For example, as shown in FIG. 7, at lengthwise position A, which is a distance $D_1$ from the ball stop 104, the distance from an outside edge of the downwardly-facing surface to the innermost inwardly-facing surface of the top rail is a distance $D_2$ between the two arrow heads, starting at the lengthwise position A (along longitudinal centerline plane 128) of the outside edge. The height difference between the bottom rail and the top rail (when the lacrosse head is placed horizontally on a horizontal surface) is not relevant to the distance between the two features. Similarly, at a lengthwise position B, which is a distance $D_3$ from the ball stop along longitudinal centerline plane 128, the distance from the outside edge of the downwardly-facing surface to the innermost inwardly-facing surface of the top rail is a distance $D_4$.

In situations where the two features are not parallel such that a measurement line cannot be perpendicular to both features, the distance measurement may be made with a line extending perpendicularly from the feature that is closer to being parallel with the overall track of the sidewall. For example, in FIG. 8, the distance $D_y$ between an outermost surface 174 of the bottom rail and an outside edge 172 of a downwardly-facing surface 139 is measured with a line that is perpendicular to the outermost surface 174 of the bottom rail.

In some embodiments, an average distance between features may be determined. For example, the average distance of the distances of two attachment locations from an innermost surface is calculated as the distance of a first attachment location from the innermost surface plus the distance of the second attachment location from the innermost surface, with the sum being divided by two. In some embodiments, the average distance of all of the attachment locations (or other features) from a surface or other feature may be determined.

As mentioned above, the lengthwise position of features may be defined with reference to the ball stop in some situations.

Returning to aspects of the sidewalls, the perimeter portions of the mesh may be pulled against the downwardly-facing surface 139 of the bottom rail in some embodiments, even though the stringing holes 144 have openings on the inwardly-facing surface and outwardly-facing surface of the sidewall.

Figure 8:
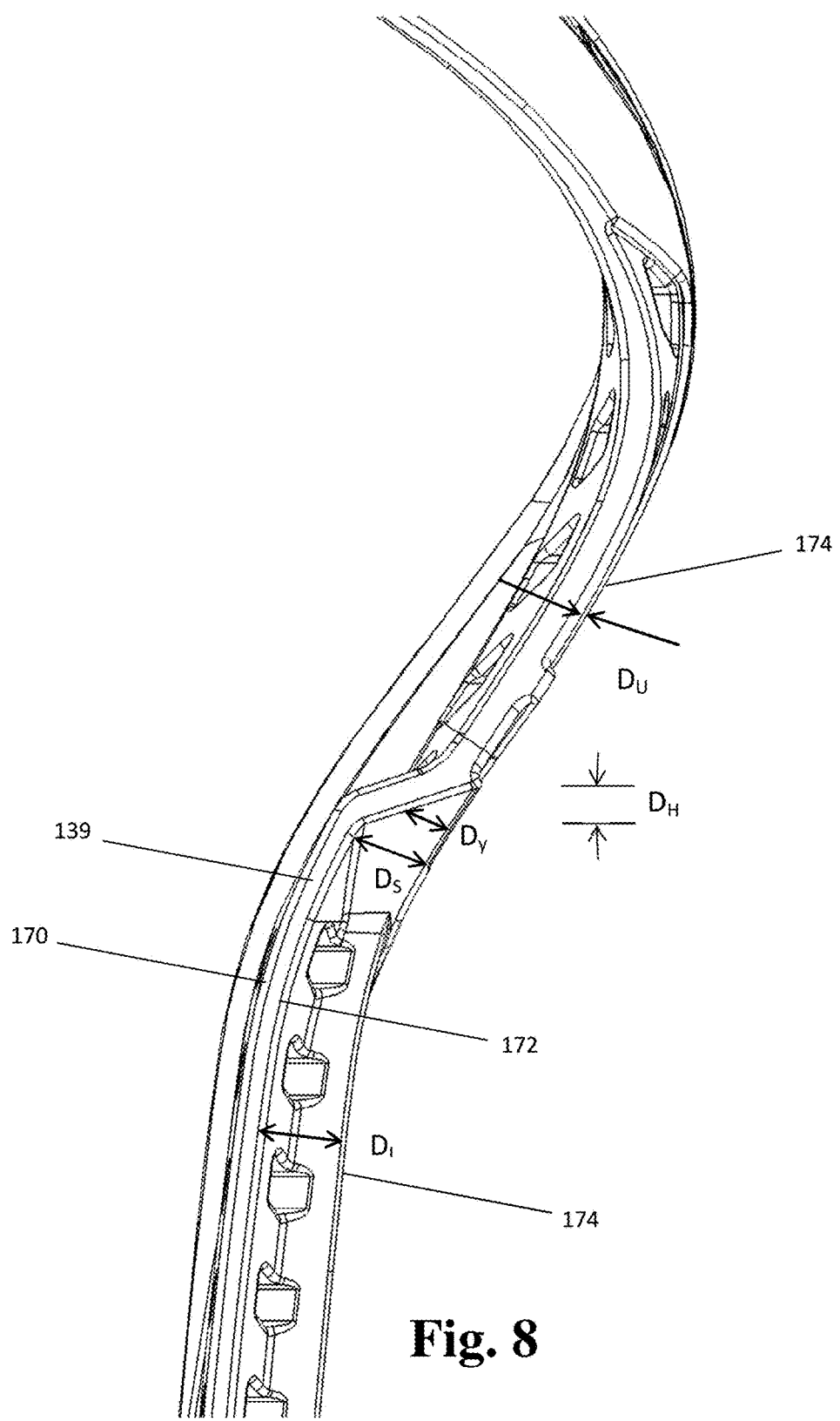
FIG. 8 is a detail view of a portion of FIG. 7.

As discussed above, in the upper head, the downwardly-facing surfaces of the bottom rails may be shifted outwardly relative to outermost surface of the bottom rail. Such an arrangement permits the mesh to pulled outwardly to increase tension. As shown in FIG. 8, the downwardly-facing surface 139 may have an inside edge 170 and an outside edge 172. In the lower head, the outside edge 172 of the downwardly-facing surface is a distance $D_L$ from an outermost surface 174 of the bottom rail. In the upper head, the outside edge 172 of the downwardly-facing surface 139 is closer to the outermost surface 174. That is, the outside edge 172 is a distance $D_U$ away from the outermost surface 174, with distance $D_U$ being less than distance $D_L$.

In the illustrated embodiment, the distance $D_U$ is small—approximately 1/32 of an inch—though distance $D_U$ may be larger than 1/32 of an inch or smaller than 1/32 of an inch. Distance $D_U$ may be zero is some embodiments where the outside edge is flush with the outermost surface 174 and/or the outside edge is the outermost surface.

The shifting of outside edge 172 closer toward, or all the way to, the outermost surface 174 of the bottom rail may take place over a short span. That is, the outside edge can shift by a distance equal to the difference between $D_L$ and $D_U$ over a relatively short longitudinal length. For example, in the embodiment illustrated in FIG. 8, the outside edge 172 shifts from 5/16 of an inch away from the outermost surface 174 to 1/32 of inch away from the outermost surface (for a shift of a distance $D_S$ of 9/32 of an inch) over a longitudinal distance of a 1/4 inch ($D_H$). This shift results in a "slope", $(D_L-D_U)/D_H$, of 1.125. In some embodiments, this slope can be even larger wherein the outside edge 172 shifts more abruptly by shifting toward the outside over a shorter distance $D_H$.

Distances $D_L$ and/or $D_U$ can be consistent throughout the lower and upper heads, respectively, or the distances may vary along the lengths of the bottom rails.

In some embodiments, such as the one shown in FIG. 8, inside edge 170 shifts outwardly with outside edge 172. In some embodiments, the inside edge of the downwardly-facing surface maintains a same distance from the outermost outwardly-facing surface of the bottom rail from immediately proximal to the first shift location to immediately distal to the first shift location. In this manner, downwardly-facing surface 139 maintains a consistent width as the surface 139 shifts outwardly relative to the sidewall. The outward shift of the inside edge may have the same calculated slope as the outside edge, or may have a different slope if the width of downwardly-facing surface 139 changes along the path of the downwardly-facing surface. For example, inside edge 170 may shift to a lesser degree than outside edge 172, resulting in a width of the downwardly-facing surface that increases during the shift (when traveling from the proximal, ball stop end toward the distal, scoop end). Inside edge 170 may not shift outwardly in some embodiments.

In further embodiments, the inside edge 172 of downwardly-facing surface 139 may shift in the manner shown in FIG. 8 while the outside edge 174 either does not shift, or shifts less than the inside edge. For example, the outside edge 174 may be spaced by a distance of $D_U$ not only in the upper head, but also in the lower head. In such an embodiment, the width of the downwardly-facing surface 139 is wider in the lower head than in the upper head.

By shifting the inside edge and/or the outside edge of the downwardly-facing surface outwardly in the upper head, the pocket can be strung against the downwardly-facing surface at positions which are further away from the longitudinal centerline plane than would otherwise be possible. And with such an arrangement, the stringing at these more outward locations is possible without increasing the width of the head at those locations.

Inwardly-facing surfaces 140, 142 and/or downwardly-facing surface 139 and a counterpart downwardly-facing surface on an opposed sidewall may be set back outwardly from longitudinal centerline plane 128 in the upper head section and extend distally into the scoop. In some embodiments, the setback blends into the scoop by way of a diminishing setback distance when travelling in the distal direction.

As part of the various embodiments disclosed herein, an inwardly-facing surface with stringing holes may be one continuous surface along substantially the entire sidewall, or the inwardly-facing surface may include multiple, discrete surfaces with gaps between stringing holes. In some cases, the inwardly-facing surface may include a first continuous surface which extends from the ball stop end of the sidewall to the transition section of the sidewall, and a second continuous surface which extends from the transition section of the sidewall to the scoop end of the sidewall.

For purposes herein, unless otherwise defined, the upper head section is defined as the section of the head that is distal to the transition section, and the lower head section is defined as the section of the head that is proximal to the transition section. The transition section is the section where the outward flare of the sidewalls starts to significantly change and the head widens more quickly than in the lower section of the head. In some embodiments, the upper head section begins at a position which is five inches from the ball stop. In other embodiments, the upper head section begins lower on the head, for example at four inches from the ball stop. In some embodiments where one or more surfaces of the bottom rail are set back in the upper head section as disclosed herein, the surfaces also may be set back in the transition section and/or the lower head section. In some cases, the upper head section and/or the lower head section may be defined as starting or ending at a specific distance from the ball stop. Or the upper head section and/or the lower head section may be defined as starting or ending relative to a head feature in terms of a fraction or percentage of a dimension of the head feature. For example, the upper head section may be defined as starting halfway from the ball stop to the distal tip of the scoop end of the head. In such cases, where the upper head section and/or lower head section are defined in such a manner, the transition section is not determinative of the upper head and/or lower head section locations.

When a sidewall rail section is described as having attachment locations, such as a plurality of stringing holes, and the attachment locations are described as each having a characteristic, not every attachment location in that rail section is necessarily required to have that characteristic. Instead, the "plurality of stringing holes" or "attachment locations" may be a subset of all of the stringing holes or attachment locations present in that rail section.

Instead of stringing holes, other attachment components may be positioned at attachment locations on the bottom rail. For example, snap fasteners, hook and loop fasteners, interference fit components, and/or other components may be used to attach a mesh to the lacrosse head. Meshes usable with embodiments described herein may be knit meshes, molded meshes, 3D printed meshes, or any other suitable type of mesh. In addition to mesh pockets, embodiments described herein may be used with traditionally strung pockets, hybrid pockets, and any other suitable type of pocket.

Figure 9:
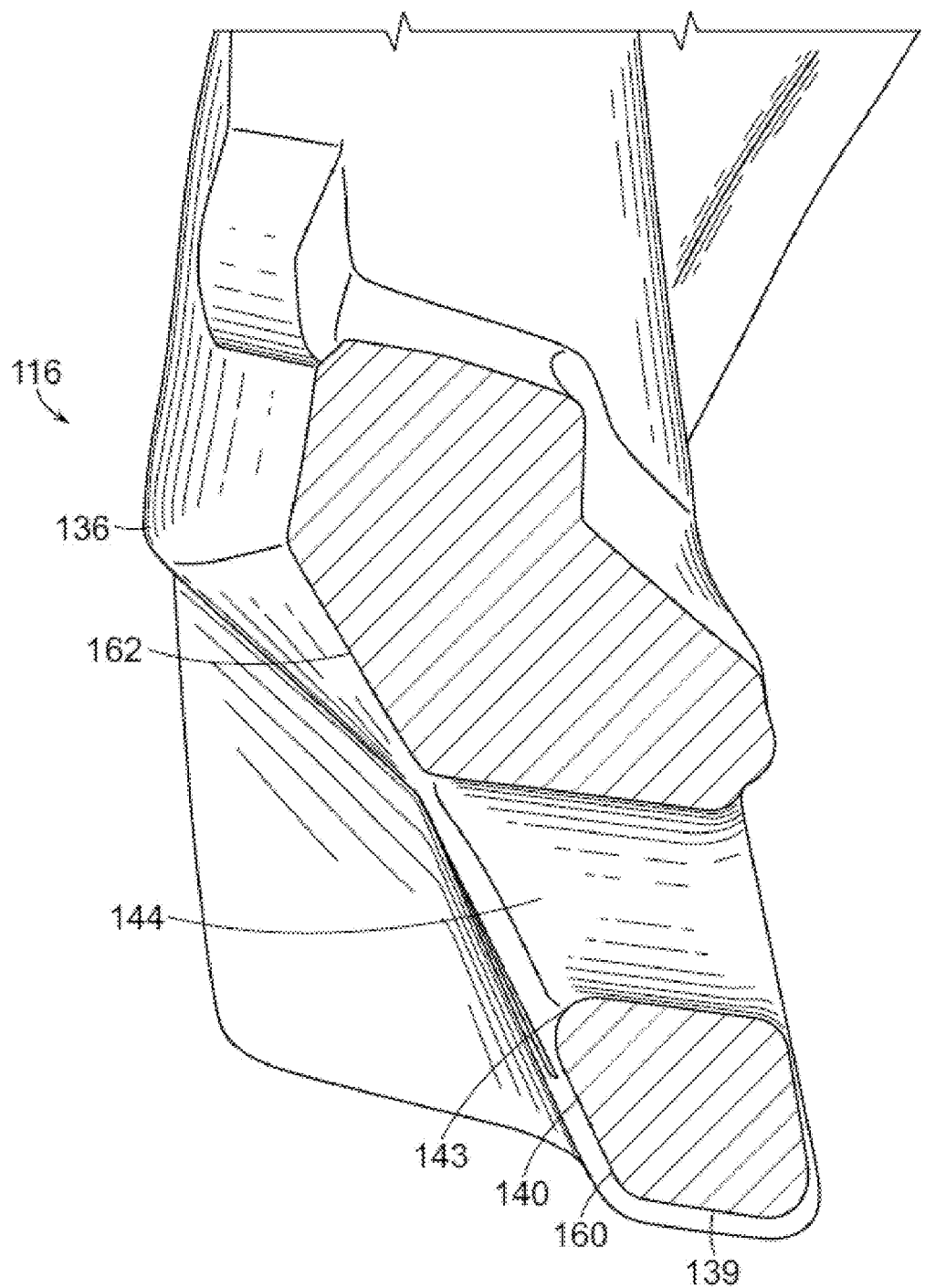
FIG. 9 is a cross-section of a portion of a bottom sidewall taken along line 9-9 in FIG. 4.

FIG. 9 shows a cross-section of a bottom rail taken along line 9-9 of FIG. 4 according to one embodiment. The left-facing surfaces in FIG. 9 face toward the longitudinal centerline plane of the head. When a sidewall string (not shown) is passed through the stringing hole 144, the string may travel over a lower perimeter portion of rim 143, continue downwardly over a lower section 160 of inwardly-facing surface 140, and wrap around the downwardly-facing surface 139 of bottom rail 116. This arrangement may pull a portion of an attached mesh against the lower section 160 of the inwardly-facing surface and/or against the downwardly-facing surface 139 of bottom rail 116. In some embodiments, the mesh material does not contact the sidewall at all, but instead is held by sidewall string that is positioned slightly away from the bottom rail. In some embodiments, the sidewall string and bottom rail may be arranged such that the mesh is pulled against an upper section 162 of inwardly-facing surface 140.

In some embodiments, the rims of the stringing holes on the inwardly-facing surface may project farther inwardly than other regions of the inwardly-facing surface. For example, a cylinder may protrude inwardly from the inwardly-facing surface to form an extended stringing hole with a rim at the end of the cylinder. Perimeter portions of the rim would be considered part of the inwardly-facing stringing hole surface if the arrangement is configured to have a sidewall string pass over those perimeter portions. Areas of the inwardly-facing surfaces which are unable to be contacted by sidewall strings are not considered to be stringing surfaces.

The rims of the stringing holes may be abruptly angled edges in some embodiments, and may be curved edges in some embodiments. For example, in some embodiments, the stringing holes may be formed with continuously curved transitions from the channel of the stringing hole to the inwardly-facing surface or outwardly-facing surface of the bottom rail. For example, the stringing hole may have the approximate shape of the bell end of a trumpet where the hole transitions to the surface. In such an embodiment, the rim would be considered the location where the surface becomes parallel with the inwardly-facing surface and/or the location where the stringing hole opening transitions to being the opening of another stringing hole.

Similarly, the inside and outside edges of the downwardly-facing surface of the bottom rails may not be abruptly angled edges. Instead, the edges may be rounded in some embodiments. In embodiments with rounded edges at the edges of the downwardly-facing surface, the edge of the downwardly-facing surface is considered to be the area where the rounded portion transitions to a substantially planar surface extending up the bottom rail.

A downwardly-facing surface may include only an edge or a very narrow surface in some embodiments. In embodiments where the downwardly-facing surface is only an edge, the edge is considered to be both an inside edge and outside edge of the downwardly-facing surface.

For purposes herein, an inwardly-facing surface does not have to be facing directly toward an opposite side of the head to be considered an inwardly-facing surface. Instead, the surface may have a planar face that faces in a direction with upward-facing or downward-facing component along with an inward-facing component. Similarly, an upwardly-facing surface and downwardly-facing surface do not have to face directly upward or directly downward, but may have an inward-facing or outward-facing component. "Upwardly facing" and "downwardly facing" are defined with respect to the lacrosse head being oriented such that the bottom rails extend generally horizontally and the open face of the head faces upwardly.

Similarly, an inwardly-facing surface does not have to face a direction that is perpendicular with the longitudinal centerline plane of the head. For example, in the transition section of the head, an inwardly-facing sidewall surface typically faces toward a distal end of the longitudinal centerline plane; this surface is considered to be an inwardly-facing surface. The inwardly-facing surface need not be planar in the up-down direction; it may be curved and have portions that face inwardly.

In the embodiments shown in FIGS. 3-5, the stringing hole surface is slanted such that it faces inwardly and downwardly. The stringing holes are also slanted such that a bottom part of the rim is positioned farther outwardly than a top part of the rim. For purposes herein, the inward/outward position of the stringing hole surface at a given lengthwise position includes all of the perimeter portions of the stringing hole inner rim over which a sidewall string can pass. That is, when a stringing hole surface is described as being positioned at least 0.20 inches outwardly from a reference surface, the stringing surface is considered to be positioned at least 0.20 inches outwardly as long as at least a portion of the rim (over which a sidewall string can pass) is at least 0.20 inches outward of the reference surface. Other portions of the stringing hole rim may be less than 0.20 inches outward of the reference surface and the stringing hole surface would still be considered to be at least 0.20 inches outward. In some embodiments, a specific portion of a feature, such as an innermost portion of a stringing hole perimeter, may be described as being a certain distance from a feature.

For purposes herein, the terms "top rail" and "bottom rail" are used in a relative sense to describe the locations of the rails relative to one another within the sidewall. The term "bottom rail" does not require that the rail be the bottommost rail in a sidewall. Similarly, the term "top rail" does not require that the rail be the topmost rail in the sidewall. In each of the embodiments described herein, the top rail may be the topmost rail and/or the bottom rail may be the bottommost rail.

For purposes herein, being positioned inwardly (or outwardly) by a distance of zero from a component means not being positioned inwardly (or outwardly) from the component. Accordingly, a first component being positioned inwardly by a distance of greater than or equal to zero from a second component means that the first component is flush with the second component or is positioned inwardly from the second component. Similarly, a first component being positioned inwardly by a distance of less than or equal a given distance from a second component means that the first component is flush with the second component or is positioned inwardly from the second component by less than the given distance.

An outermost surface or an innermost surface may be an edge in some embodiments. For example, the outermost surface of a bottom rail may be a narrow surface or a rounded or sharp edge.

Figure 10:
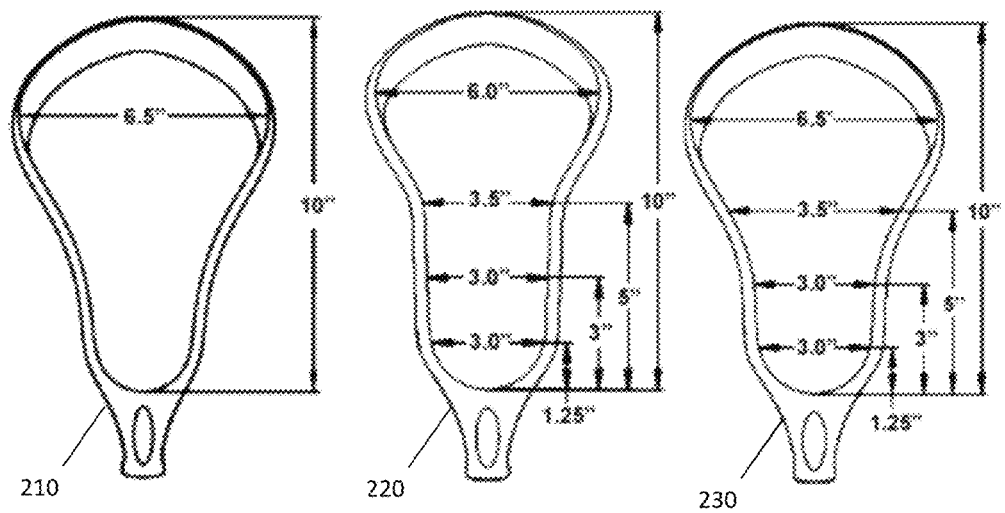
FIG. 10 shows minimum lacrosse head dimensions according to different standards.

FIG. 10 shows minimum lacrosse head dimensions according to different standards. A lacrosse head 210 needs to be at least ten inches from ball stop to the distal end of the head, and at least 6.5 inches across at its maximum width to be legal for play for high school and youth lacrosse. For NCAA play, minimum widths are prescribed at three different distances from the ball stop and at a maximum width, as shown in a lacrosse head 220. The minimum length of ten inches is also required for NCAA play. A lacrosse head 230 combines the two standards and is considered to be a universal standard as such a lacrosse head is legal for youth, high school, and NCAA play.

Embodiments described herein may be used with traditionally strung pockets, mesh pockets, hybrid pockets, molded pockets, and any other suitable type of pocket.

The above aspects and embodiments may be employed in any suitable combination, as the present invention is not limited in this respect.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A lacrosse head comprising:
    a scoop end;
    a ball stop end;
    an imaginary longitudinal centerline plane extending from the ball stop end to the scoop end; and
    first and second opposed sidewalls, the first and second sidewalls extending from a lower head section to an upper head section; wherein
    the first sidewall includes a first bottom rail having a first bottom, downwardly-facing surface that includes an inside edge and an outside edge;
    the first bottom rail has a first outermost outwardly-facing surface at lengthwise positions of the first bottom rail;
    the second sidewall includes a second bottom rail having a second bottom, downwardly-facing surface that includes an inside edge and an outside edge;
    the second bottom rail has a second outermost outwardly-facing surface at lengthwise positions of the first bottom rail;
    in the lower head section, the outside edge of the first bottom, downwardly-facing surface is positioned inwardly from the first outermost outwardly-facing surface by a first distance;
    in the lower head section, the outside edge of the second bottom, downwardly-facing surface is positioned inwardly from the second outermost outwardly-facing surface by a second distance;
    in the upper head section, the outside edge of the first bottom, downwardly-facing surface is positioned inwardly from the first outermost outwardly-facing surface by a third distance that is less than the first distance;
    in the upper head section, the outside edge of the second bottom, downwardly-facing surface is positioned inwardly from the second outermost outwardly-facing surface by a fourth distance that is less than the second distance;
    on the first bottom rail at a first shift location where the first outside edge starts to shift outwardly to be closer to the first outermost outwardly-facing surface, the inside edge of the first downwardly-facing surface moves outwardly away from the longitudinal centerline plane; and
    on the second bottom rail at a second shift location where the second outside edge starts to shift outwardly to be closer to the second outermost outwardly-facing surface, the inside edge of the second downwardly-facing surface moves outwardly away from the longitudinal centerline plane.

2. A lacrosse head as in claim 1, wherein the first bottom rail is the bottommost rail of the first sidewall, and the second bottom rail is the bottommost rail of the second sidewall.

3. A lacrosse head as in claim 2, wherein the inside and outside edges of the first downwardly-facing surface maintain a same distance from one another from immediately proximal to the first shift location to immediately distal to the first shift location.

4. A lacrosse head as in claim 2, wherein the inside edge of the first downwardly-facing surface maintains a same distance from the first outermost outwardly-facing surface of the bottom rail from immediately proximal to the first shift location to immediately distal to the first shift location.

5. A lacrosse head as in claim 2, wherein the first distance is equal to the second distance.

6. A lacrosse head as in claim 5, wherein the third distance is equal to the fourth distance.

7. A lacrosse head as in claim 2, wherein the outside edge of the first downwardly-facing surface is the first outermost outwardly-facing surface of the bottom rail in the upper head section.

8. A lacrosse head as in claim 2, wherein the outside edge of the first downwardly-facing surface is an abruptly angled edge.

9. A lacrosse head comprising:
    a scoop end with a scoop;
    a ball stop end with a ball stop;
    an imaginary longitudinal centerline plane extending from the ball stop end to the scoop end; and
    first and second opposed sidewalls, the first and second sidewalls extend from a lower head section to an upper head section; wherein
    the first sidewall includes a first top rail having a first innermost inwardly-facing surface;
    the first sidewall includes a first bottom rail having a first bottom, downwardly-facing surface that includes an inside edge and an outside edge;
    the first bottom rail has a first outermost outwardly-facing surface at lengthwise positions of the first bottom rail;
    the second sidewall includes a second top rail having a second innermost inwardly-facing surface;
    the second sidewall includes a second bottom rail having a second bottom, downwardly-facing surface that includes an inside edge and an outside edge;
    the second bottom rail has a second outermost outwardly-facing surface at lengthwise positions of the first bottom rail;
    in the lower head section, the inside edge of the first bottom, downwardly-facing surface is positioned inwardly from the first outermost outwardly-facing surface by a first distance;
    in the lower head section, the inside edge of the second bottom, downwardly-facing surface is positioned inwardly from the second outermost outwardly-facing surface by a second distance;
    in the upper head section, first starting at a location at least halfway from the ball stop to the scoop, the inside edge of the first bottom, downwardly-facing surface is positioned inwardly from the first outermost outwardly-facing surface by a third distance that is less than the first distance;
    in the upper head section, first starting at a location at least halfway from the ball stop to the scoop, the inside edge of the second bottom, downwardly-facing surface is positioned inwardly from the second outermost outwardly-facing surface by a fourth distance that is less than the second distance;

in the upper head section, the inside edge of the first bottom, downwardly-facing surface is positioned outwardly of the first innermost inwardly-facing surface of the first top rail; and in the upper head section, the inside edge of the second bottom, downwardly-facing surface is positioned outwardly of the second innermost inwardly-facing surface of the second top rail.

10. A lacrosse head as in claim 9, wherein the first bottom rail is the bottommost rail of the first sidewall, and the second bottom rail is the bottommost rail of the second sidewall.

11. A lacrosse head as in claim 10, wherein the inside edge of the first, downwardly-facing surface first starts at a shift location to be positioned inwardly from the first outermost outwardly-facing surface by the third distance that is less than the first distance, and the inside and outside edges of the first downwardly-facing surface maintain a same distance from one another from immediately proximal to the shift location to immediately distal to the first shift location.

12. A lacrosse head as in claim 10, wherein the first distance is equal to the second distance.

13. A lacrosse head as in claim 12, wherein the third distance is equal to the fourth distance.

14. A lacrosse head as in claim 10, wherein the outside edge of the first downwardly-facing surface is the first outermost outwardly-facing surface of the bottom rail.

15. A lacrosse head as in claim 10, wherein the inside edge of the first bottom, downwardly-facing surface is an abruptly angled edge.

* * * * *